(12) United States Patent
Sakabe et al.

(10) Patent No.: US 8,768,130 B1
(45) Date of Patent: Jul. 1, 2014

(54) MULTIMODE OPTICAL FIBER

(71) Applicant: Sumitomo Electric Industries, Ltd., Osaka (JP)

(72) Inventors: Itaru Sakabe, Yokohama (JP); Yuya Homma, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/939,800

(22) Filed: Jul. 11, 2013

Related U.S. Application Data

(63) Continuation of application No. 13/779,951, filed on Feb. 28, 2013, now abandoned.

(51) Int. Cl.
*G02B 6/028* (2006.01)

(52) U.S. Cl.
USPC ............................................ 385/124

(58) Field of Classification Search
None
See application file for complete search history.

(56) References Cited

U.S. PATENT DOCUMENTS

| | | | |
|---|---|---|---|
| 5,123,076 A * | 6/1992 | Nishimoto et al. | 385/124 |
| 7,646,955 B2 | 1/2010 | Donlagic | |
| 8,290,323 B2 | 10/2012 | Donlagic | |
| 8,340,488 B2 | 12/2012 | Molin et al. | |
| 2009/0052848 A1 * | 2/2009 | Shimotakahara et al. | 385/114 |
| 2011/0002590 A1 * | 1/2011 | Ooizumi et al. | 385/124 |
| 2011/0044596 A1 * | 2/2011 | Zhang et al. | 385/124 |

* cited by examiner

*Primary Examiner* — Michelle R Connelly
(74) *Attorney, Agent, or Firm* — Drinker Biddle & Reath LLP (57) ABSTRACT

The present invention relates to a multimode optical fiber including a glass fiber, and a coating member provided on an outer periphery of the glass fiber. The glass fiber extends along a predetermined central axis, and includes at least a core region having a GI-type refractive index profile. The coating member has a refractive index that is higher than a minimum refractive index of the core region. According to this configuration, leakage of a higher-order mode with a large group delay difference to the coating member side is facilitated.

4 Claims, 9 Drawing Sheets

MULTIMODE OPTICAL FIBER

This is a continuation application of copending prior application Ser. No. 13/779,951, filed on Feb. 28, 2013, which is incorporated by reference herein in its entirety.

BACKGROUND OF THE INVENTION

1. Field of the Invention

The present invention relates to a multimode optical fiber.

2. Related Background Art

It is known that a multimode optical fiber structurally has greater transmission loss in comparison to a single mode optical fiber for use in long-haul optical communication. Meanwhile, a multimode optical fiber is broadly used in short-haul information communication, in a local area network (LAN) for example, because inter-fiber connection and connection with equipment is easy.

With the aim of improving short-haul information communication, technology for reducing the transmission loss of the multimode optical fiber and expansion of the communication band (wider bandwidth) are being researched. Meanwhile, research on a multimode optical fiber having higher physical reliability is hardly being conducted.

SUMMARY OF THE INVENTION

As a result of examining in detail a conventional multimode optical fiber, the present inventors discovered the following problems. Note that, in the present specification, when the expression of "optical fiber" is simply used without any specific reference, such expression shall mean "multimode optical fiber".

A multimode optical fiber is known as an optical transmission medium in which a plurality of modes propagate. However, when in particular a radiation mode (higher-order mode with a large group delay difference), among the plurality of propagation modes, propagates in a longitudinal direction of the multimode optical fiber, the group delay difference between the propagation modes will increase and, therefore, there was a limit in the wider bandwidth of the multimode optical fiber.

Since a multimode optical fiber is mainly subject to connecting procedures via fusion splice and installment in a state with a small bend added thereto, the possibility of damage increases in comparison to a single mode optical fiber for long-haul communication, and increase of bending loss is also unavoidable.

The present invention was devised in order to overcome the foregoing problems, and an object of the present invention is to provide a multimode optical fiber comprising a structure capable of realizing a wider bandwidth by reducing the group delay difference between the propagation modes. In addition, another object of the present invention is to provide a multimode optical fiber comprising a structure capable of satisfying both the inhibition of increase of failure probability and the inhibition of increase of bending loss.

The present invention relates to a graded index (GI)-type multimode optical fiber having GI-type refractive index profile including a region in which the refractive index continuously decreases from the central axis in a radial direction thereof, and this multimode optical fiber is clearly differentiated from a single mode optical fiber for use in long-haul transmission in terms of structure. Moreover, the GI-type multimode optical fiber includes, in addition to a multimode optical fiber having a general structure constituted by a core region with a high refractive index and a cladding region with a low refractive index, a GI-type multimode optical fiber comprising a trench part with a low refractive index provided to the outer periphery of the core region (hereinafter referred to as the "BI-type multimode optical fiber"). Note that the trench part has a refractive index that is lower than the refractive index of the cladding region, and offers, to the multimode optical fiber, resistance against fluctuation in the transmission properties caused by bending. Moreover, the foregoing GI-type multimode optical fiber includes a thin hard plastic coated silica fiber (HPCF) and carbon-coated fiber (CCF). Here, the HPCF is an optical fiber in which the core region is composed of silica glass, and the cladding region or a part thereof is constituted by a coating member composed of a plastic resin with a low refractive index and a high hardness. Moreover, when the term "multimode optical fiber" is simply used in this specification, reference is made to the GI-type multimode optical fiber, as well as to the BI-type multimode optical fiber, HPCF, and CCF belonging to the GI-type multimode optical fiber.

The multimode optical fiber according to the present embodiment comprises a glass fiber extending along a central axis, and a coating member provided outside the glass fiber. In particular, in a first aspect according to the present embodiment, as a GI-type multimode optical fiber, the glass fiber includes at least a core region in which the refractive index continuously decreases from a central axis in a radial direction of the multimode optical fiber. Moreover, the coating member surrounding the core region has a refractive index that is higher than a minimum refractive index in the glass fiber.

As a second aspect that can be applied to the first aspect, the refractive index of the coating member is preferably not greater than a maximum refractive index of the core region.

As a third aspect that can be applied to at least either of the first and the second aspects, the coating member may be adhered tightly to the outer periphery of the core region. In other words, the glass fiber may be constituted by only the core region.

In addition, as a fourth aspect that can be applied to at least either of the first and the second aspects, the multi-fiber optical fiber may further comprise a cladding region provided between the outer periphery of the core region and the coating member so as to adhere tightly to the outer periphery of the core region. In this case, thickness of the cladding region in the radial direction of the multimode optical fiber is preferably 1 to 10 μm. In addition, the thickness of the cladding region in the radial direction is more preferably 6 to 10 μm. Moreover, as a fifth aspect that can be applied to the fourth aspect, the minimum refractive index of the core region is preferably higher than the refractive index of the cladding region. Note that, when the cladding region, provided between the core region and the coating member, is composed of a glass material, the cladding region constitutes a part of the glass fiber surrounded by the coating member.

As a sixth aspect that can be applied to at least any one of the first to fifth aspects, the cladding region provided between the core region and the coating member may be composed of plastic resin. In addition, as a seventh aspect that can be applied to at least any one of the first to sixth aspects, the coating member may be composed of silicone-based resin.

As an eighth aspect that can be applied to at least any one of the first to seventh aspects, the glass fiber may have an outer diameter of 99.9 μm or less, and the multimode optical fiber may have an n value (coefficient of fatigue) of or higher, and a screening level of 1.0% or higher. Moreover, as a ninth aspect that can be applied to at least any one of the first to seventh aspects, the glass fiber may have an outer diameter of 124.9 µm or less, and the multimode optical fiber may have an n value of 26 or higher, and a screening level of 1.0% or higher.

In addition, as a tenth aspect that can be applied to at least either of the eighth and the ninth aspects, the multimode optical fiber preferably has fiber stiffness of 9 gf/mm² or more.

The respective embodiments of this invention should be additionally and sufficiently understandable based on the ensuing detailed explanation and appended drawings. These embodiments are presented only for illustrative purposes, and should not be interpreted as limiting this invention in any way.

Moreover, the further applicable scope of this invention will become clear from the ensuing detailed explanation. Nevertheless, while the detailed explanation and specific case examples represent the preferred embodiments of the present invention, they are presented only for illustrative purposes, and it is evident that it would be obvious for those skilled in the art to comprehend the various modifications and improvements of the scope of the present invention from the ensuing detailed explanation.

DESCRIPTION OF THE PREFERRED EMBODIMENTS

The respective embodiments of a multimode optical fiber according to the present invention are now explained in detail with reference to the appended drawings. Note that, in the explanation of the drawings, the same reference numeral is given to the same parts and same elements, and the redundant explanation thereof is omitted.

First Embodiment

Figure 1:
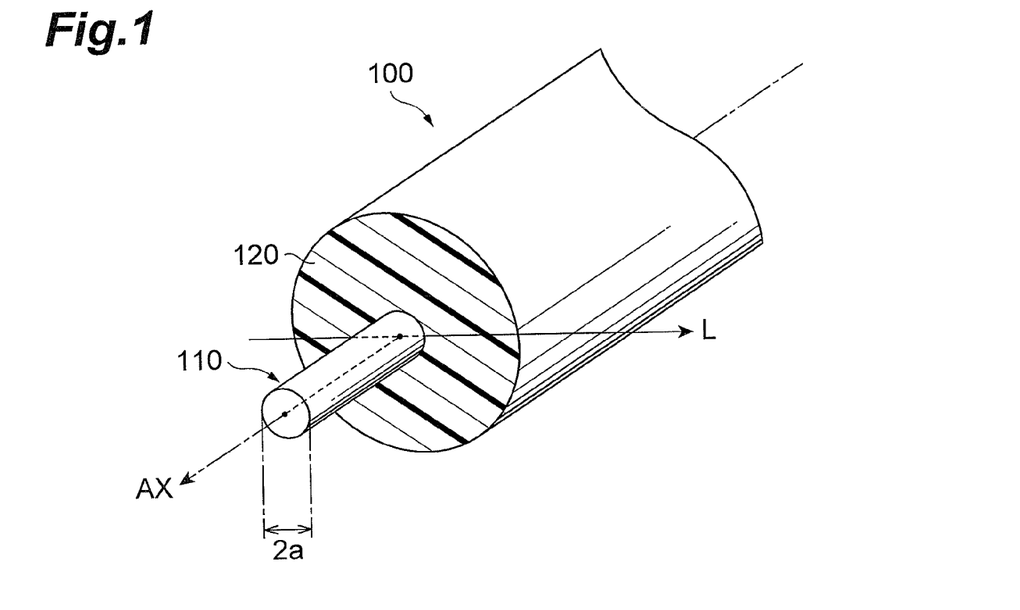
FIG. 1 is a diagram showing the basic cross section structure of the multimode optical fiber according to the present invention.

FIG. 1 is a diagram showing the basic cross section structure of the multimode optical fiber according to the present invention. The multimode optical fiber 100 shown in FIG. 1 has the basic structure that can be applied to any one of the first to third embodiments of the present invention. The multimode optical fiber 100 comprises a glass fiber 110 having an outer diameter 2a (glass diameter), and a coating member 120 provided on an outer periphery of the glass fiber 110. The glass fiber 110 is composed of silica glass.

The glass fiber 110 extends along a central axis AX (coincides with the optical axis), and includes at least a core region having a refractive index profile (GI-type refractive index profile) in which the refractive index continuously decreases from the central axis AX along the radial direction of the multimode optical fiber. As one example, this kind of GI-type refractive index profile can be realized by adding, to the core region, an agent such as $GeO_2$ (germanium dioxide) for increasing the refractive index such that the concentration of such an agent continuously decreases from the central axis AX along the radial direction. The refractive index profile of the core is preferably a profile referred to as the α-power profile which becomes a convex on the refractive index profile diagram shown in FIGS. 2 to 5. Moreover, the coating member 120 surrounding the glass fiber 110 has a refractive index that is higher than a minimum refractive index of the core region (included in the glass fiber 110), and is composed of plastic resin. As the plastic resin, fluorine-based resin (resin that has been conventionally used as a cladding material of a plastic cladding optical fiber) based on urethane acrylate or epoxy-based acrylate may be used, but the refractive index profile (FIGS. 2 to 5) of the multimode optical fiber 100 may be used without having to contain expensive fluorine-based resin which uses silicone-based resin.

Note that, in the first embodiment, by causing the refractive index of the coating member 120 that is coating the glass fiber 110 to be greater than the minimum refractive index of the core region (more specifically, to be greater than the refractive index of the peripheral region of the glass fiber 110), the present invention comprises a structure capable of facilitating the leakage of a higher-order mode with a large group delay difference to the coating member side. As a result of adopting this kind of structure, in the first embodiment, since the propagation of the higher-order mode along the longitudinal direction of the multimode optical fiber 100 is inhibited, the group delay difference between the propagation modes can be reduced.

FIGS. 2 to 5 are various refractive index profiles that can be applied to any one of the first to third embodiments of the present invention. Refractive index profiles 150A to 150D shown in FIGS. 2 to 5 show the refractive index at the respective parts along the radial direction on line L (refer to FIG. 1) that is orthogonal to the central axis AX.

Figure 2:
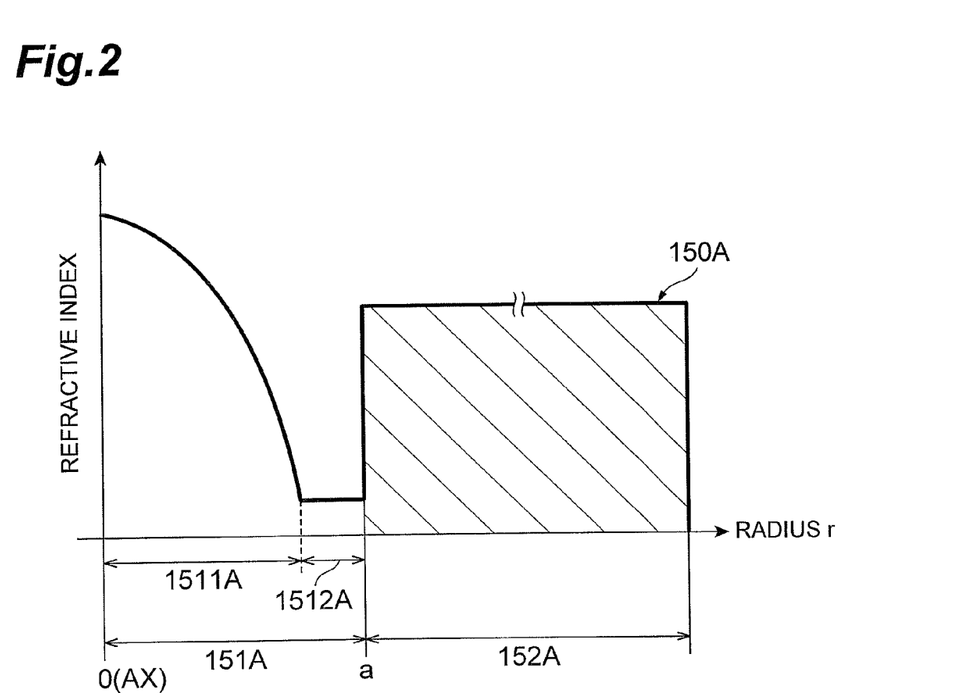
FIG. 2 is a refractive index profile having a first structure as the refractive index profile that can be applied to the multimode optical fiber shown in FIG. 1.

In the refractive index profile 150A shown in FIG. 2, a region 151A is a region corresponding to the glass fiber 110 having the outer diameter 2a, and a region 152A is a region corresponding to the coating member 120. The region 151A is configured from a region 1511A corresponding to the core region having a refractive index profile (GI-type refractive index profile) of an α-power profile in which the refractive index continuously decreases from the central axis AX along the radial direction, and a region 1512A corresponding to the cladding region having the same refractive index as the minimum refractive index of the core region. The region 152A corresponding to the coating member 120 is set to a refractive index that is higher than the minimum refractive index of the core region (refractive index in the region 1512A) corresponding to the region 1511A and lower than the maximum refractive index of the core region (refractive index of the portion positioned on the central axis AX). Note that, in the example of FIG. 2, the cladding region is composed of silica glass (an additive which changes the refractive index of glass may also be added thereto), and constitutes a part of the glass fiber 110.

Note that, when the optical fiber is to be used in an extremely short-haul of several ten meters or less, the region 152A corresponding to the coating member 120 may be set to be higher than the maximum refractive index of the core region. In the refractive index profile 150A, the thickness of the cladding region corresponding to the region 1512A in the radial direction is preferably 1 to 10 μm. In other words, by setting the thickness of the cladding region contained in the glass fiber 110 in the radial direction to 1 to 10 μm, the numerical aperture of the multimode optical fiber 100 can be kept low, and the coupling efficiency with optical parts such as a photodiode can be improved. The thickness of the cladding region in the radial direction is more preferably 6 to 10 μm.

Figure 3:
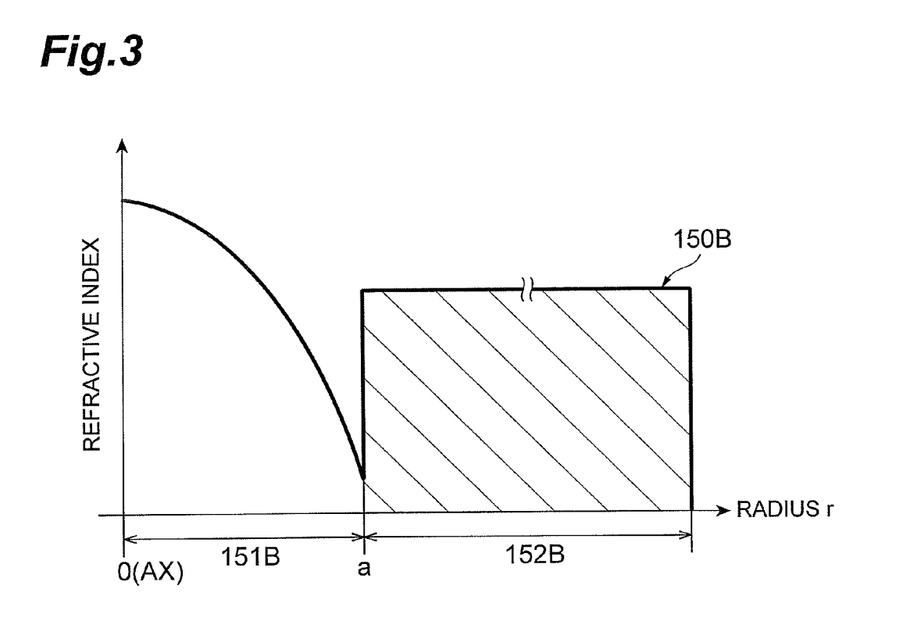
FIG. 3 is a refractive index profile having a second structure as the refractive index profile that can be applied to the multimode optical fiber shown in FIG. 1.

In the refractive index profile 150B shown in FIG. 3, a region 151B is a region corresponding to the glass fiber 110 having the outer diameter 2a, and a region 152B is a region corresponding to the coating member 120. The refractive index profile 150B is obtained by configuring the overall glass fiber 110 only with the core region having a refractive index profile (GI-type refractive index profile) of an α-power profile in which the refractive index continuously decreases from the central axis AX in the radial direction, and directly providing the coating member 120 on the outer periphery of the glass fiber 110 (core region) (causing the outer periphery of the glass fiber 110 and the coating member 120 to come into close contact). Even with the refractive index profile 150B having the foregoing structure, as with the case of the refractive index profile 150A (FIG. 2), the higher-order mode with a large group delay difference can be effectively leaked to the coating member 120 side. The structure of FIG. 3 yields an effect of being able to eliminate a higher-order mode with a larger group delay in comparison to the structure of FIG. 2.

Figure 4:
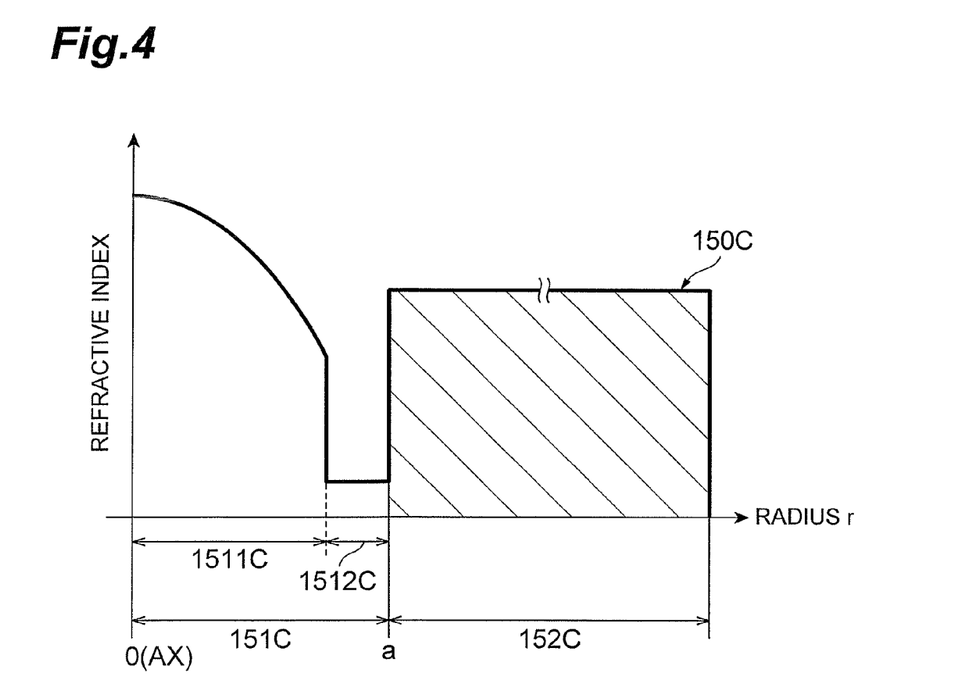
FIG. 4 is a refractive index profile having a third structure as the refractive index profile that can be applied to the multimode optical fiber shown in FIG. 1.

In the refractive index profile 150C shown in FIG. 4, a region 151C is a region corresponding to the glass fiber 110 having the outer diameter 2a, and a region 152C is a region corresponding to the coating member 120. The region 151C is configured from a region 1511C corresponding to the core region having a refractive index profile (GI-type refractive index profile) of an α-power profile in which the refractive index continuously decreases from the central axis AX along the radial direction, and a region 1512C corresponding to the cladding region having a refractive index that is lower than the minimum refractive index of the core region and that is lower than the refractive index of the coating member, and which functions as a trench part. The thickness of the region 1512C is preferably 1 to 10 μm, and more preferably 6 to 10 μm. The region 152C corresponding to the coating member 120 is set to a refractive index that is higher than the minimum refractive index of the core region corresponding to the region 1511C and lower than the maximum refractive index of the core region (refractive index of the portion positioned on the central axis AX). Note that, in the example of FIG. 4 also, the cladding region is composed of silica glass, and constitutes a part of the glass fiber 110. Based on this refractive index profile 150C, it is possible to effectively leak the higher-order mode to the coating member and reduce the group delay difference between the propagation modes, and effectively inhibit the increase of bending loss in the multimode optical fiber 100.

Figure 5:
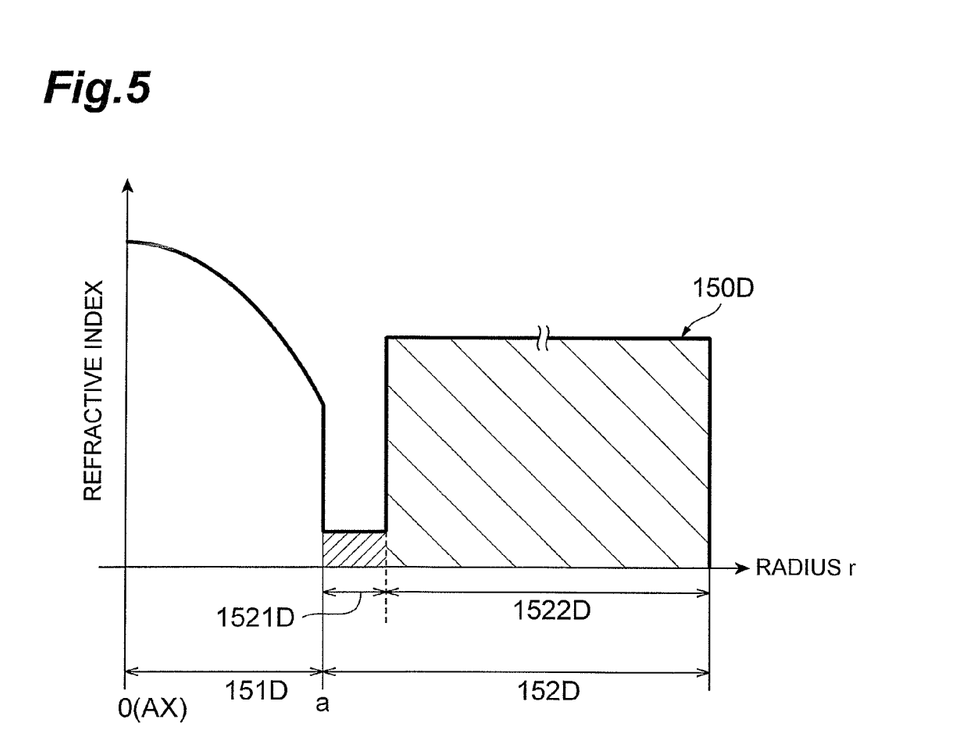
FIG. 5 is a refractive index profile having a fourth structure as the refractive index profile that can be applied to the multimode optical fiber shown in FIG. 1.

In the refractive index profile 150D shown in FIG. 5, a region 151D corresponds to the glass fiber 110 having the outer diameter 2a. A region 152D is configured from a region 1521D corresponding to the cladding region which functions as a trench part provided between the glass fiber 110 and the coating member 120, and a region 1522D corresponding to the coating member 120. The multimode optical fiber having the refractive index profile 150D differs from the multimode optical fiber having the refractive index profile 150C with respect to the point at the cladding region corresponding to the region 1521D is composed of plastic resin. In other words, the region 151D is a region corresponding to the glass fiber 110 that is constituted only by the core region having a GI-type refractive index profile of an α-power profile in which the refractive index continuously decreases from the central axis AX along the radial direction. In this refractive index profile 150D also, the cladding region (trench part) composed of plastic resin corresponding to the region 1521D preferably has a refractive index that is lower than the minimum refractive index of the glass fiber 110 (only the core region), and the thickness in the radial direction is preferably 1 to 10 μm, more preferably 6 to 10 μm. The same effect as the refractive index profile 150C (FIG. 4) can also be obtained with the refractive index profile 150D. Since the cladding region 1521D is composed of plastic resin, the probability of the multimode optical fiber of FIG. 5 becoming damaged when bent to a small diameter (bend radius of roughly 2 mm) is smaller in comparison to the multimode optical fiber of FIG. 4.

Note that, with all refractive index profiles 150A to 150D shown in FIGS. 2 to 5, the refractive index of the outer periphery of the core region is minimal.

Second Embodiment

The multimode optical fiber according to the second embodiment also has the cross section structure shown in FIG. 1. In other words, the multimode optical fiber according to the second embodiment comprises a glass fiber 110 extending along the central axis AX (optical axis), and a coating member 120 provided on an outer periphery of the glass fiber 110, and all refractive index profiles 150A to 150D shown in FIGS. 2 to 5 can be applied thereto.

Moreover, the multimode optical fiber according to the second embodiment has a structure capable of obtaining the same effect as the first embodiment, and additionally inhibiting the increase of failure probability and inhibiting the increase of bending loss by optimizing the outer diameter 2a, n value and fiber stiffness of the glass fiber 110.

Here, the foregoing n value means the coefficient of fatigue, which is one index that shows the fatigue properties of an optical fiber, and is obtained based on the static fatigue test or the dynamic fatigue test prescribed in IEC60793-1-33. With the static fatigue test or the dynamic fatigue test, the n value is obtained by adding given strain (bending) to the optical fiber and measures the time required until failure. Meanwhile, with the dynamic fatigue test, the n value is obtained by measuring the rupture strength while changing the rate of strain that is added to the optical fiber. In other words, the n value is one parameter which represents the strength related to the growth rate of cracks on the optical fiber surface, and is a numerical value that is used as an index showing the reliability against the failure of the optical fiber when stress or stress fluctuation is repeatedly added to the optical fiber. Moreover, there is correlation between the n value and the failure probability, and as the n value increases, the numerical value of the failure probability decreases (that is, failure becomes more difficult). Thus, as a result of prescribing the n value through back calculation from the demanded failure probability, it is possible to indicate the reliability of that optical fiber.

Moreover, screening is a method of causing a low strength portion to failure in advance by adding a given elongation strain across the entire length of the optical fiber in order to eliminate defects and the like of the glass and increase the structure reliability. The screening level represents the value of the foregoing elongation strain, and it could be said that greater the value, the higher the reliability of the optical fiber. Note that the screening level of 1% is equivalent to a state of adding an elongation strain of 0.69 GPa to the coated optical fiber along the longitudinal direction, or a state of adding weight of 8.8 N to the coated optical fiber along the longitudinal direction.

The multimode optical fiber according to the second embodiment has an outer diameter $2a$ of 99.9 μm or less, an n value of 21 or higher, and a screening level of 1.0% or higher in order to inhibit the practical tolerable failure probably upon bending the multimode optical fiber at a bend radius of 1.5 mm or less to be $10^{-4}$ or less.

Figure 6:
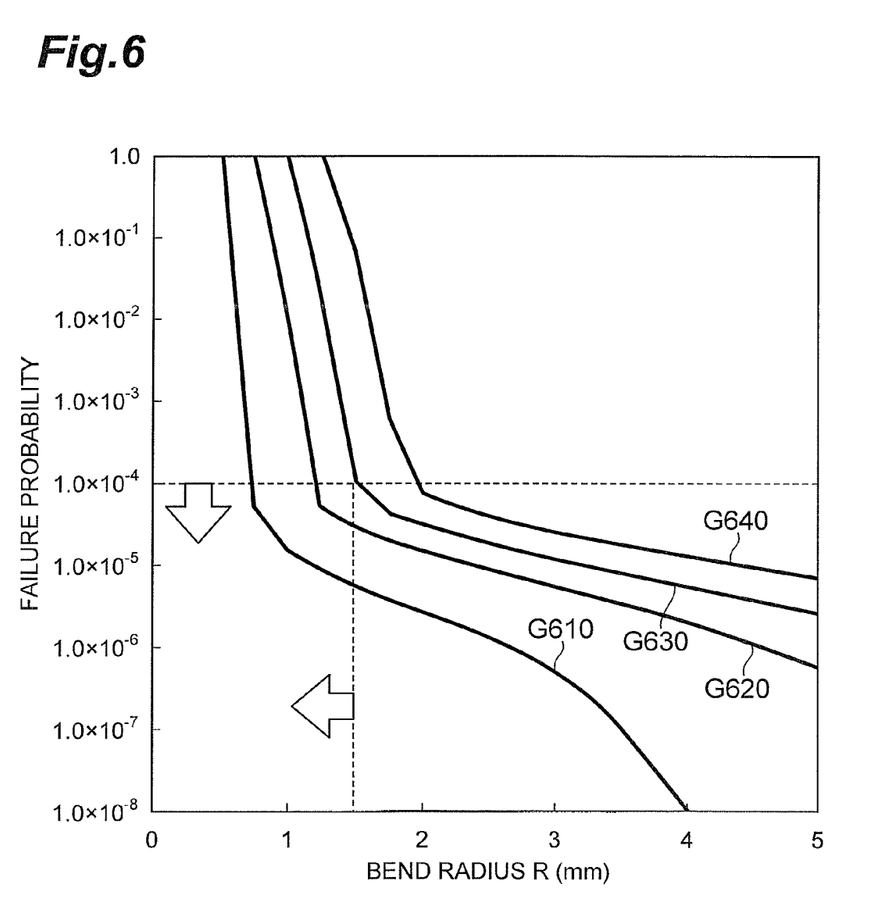
FIG. 6 is a graph showing the relation of the bend radius R (mm) and the failure probability regarding the multimode optical fiber according to the second embodiment.

FIG. 6 is a graph showing the relation of the bend radius R (mm) and the failure probability regarding the multimode optical fiber according to the second embodiment. Note that FIG. 6 shows a graph in which the n value is fixed to 20 and the screening level is fixed to 1.0%, and the glass outer diameter $2a$ is changed between 50 and 125 wherein a graph G610 shows the relation of the failure probability and the bend diameter of the multimode optical fiber in which the glass outer diameter $2a$ is 50 μm, a graph G620 shows the relation of the failure probability and the bend diameter of the multimode optical fiber in which the glass outer diameter $2a$ is 80 μm, a graph G630 shows the relation of the failure probability and the bend diameter of the multimode optical fiber in which the glass outer diameter $2a$ is 100 μm, and a graph G640 shows the relation of the failure probability and the bend diameter of the multimode optical fiber in which the glass outer diameter $2a$ is 125 μm.

Note that, with respect to the bending property, while the transmission loss tends to increase upon forming a multimode optical fiber in to a cable when the glass diameter is small, it is possible to inhibit the transmission loss to be a tolerable transmission loss by causing the fiber stiffness to be 9 gf·mm² or more.

Third Embodiment

The multimode optical fiber according to the third embodiment also has the cross section structure shown in FIG. 1. In other words, the multimode optical fiber according to the third embodiment comprises a glass fiber 110 extending along the central axis AX (optical axis), and a coating member 120 provided on an outer periphery of the glass fiber 110, and all refractive index profiles 150A to 150D shown in FIGS. 2 to 5 can be applied thereto. Moreover, the multimode optical fiber according to the third embodiment has a structure capable of obtaining the same effect as the first embodiment, and additionally inhibiting the increase of failure probability and inhibiting the increase of bending loss by optimizing the outer diameter $2a$, n value and fiber stiffness of the glass fiber 110.

The multimode optical fiber according to the third embodiment has an outer diameter $2a$ of 124.9 μm or less, an n value of 26 or higher, and a screening level of 1.0% or higher in order to inhibit the practical tolerable failure probably upon bending the multimode optical fiber at a bend radius of 1.5 mm or less to be $10^{-4}$ or less.

Figure 7:
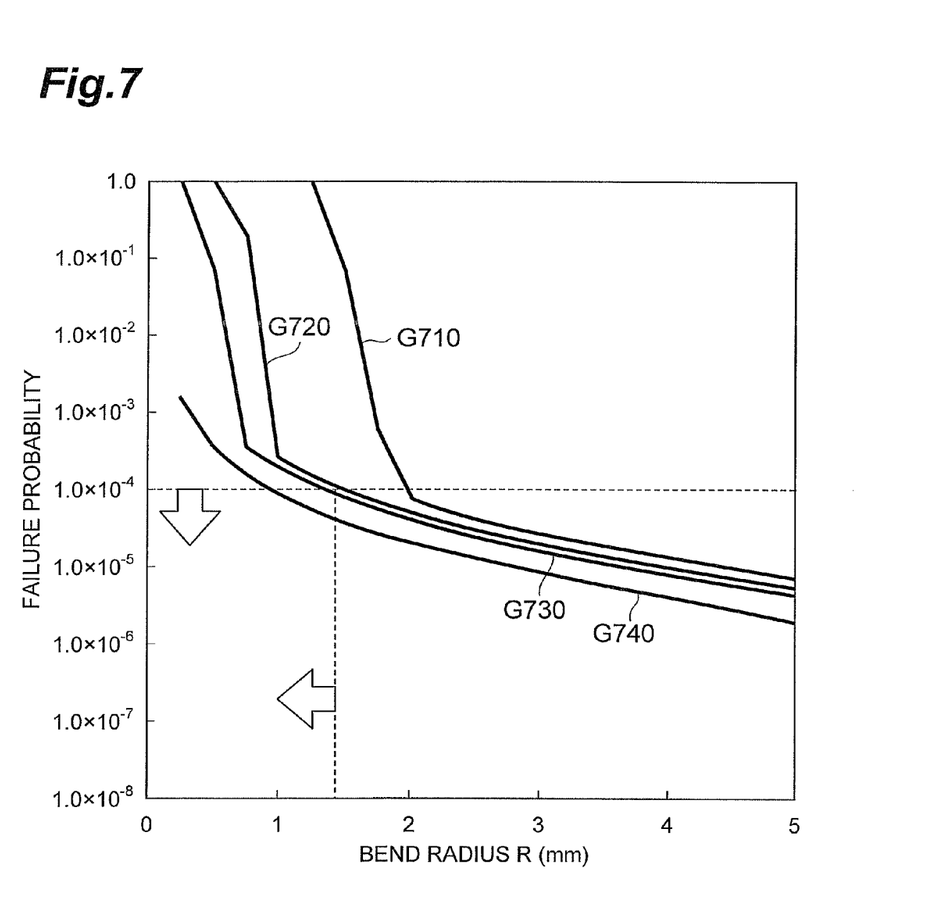
FIG. 7 is a graph showing the relation of the bend radius R (mm) and the failure probability regarding the multimode optical fiber according to the third embodiment.

Moreover, FIG. 7 is a graph showing the relation of the bend radius R (mm) and the failure probability regarding the multimode optical fiber according to the third embodiment. Note that FIG. 7 shows a graph in which the glass outer diameter $2a$ is fixed to 125 μm and the screening level is fixed to 1.0%, and the n value is changed between 20 to 100, wherein a graph G710 shows the relation of the failure probability and the bend diameter of the multimode optical fiber in which the n value is 20, a graph G720 shows the relation of the failure probability and the bend diameter of the multimode optical fiber in which the n value is 25, a graph G730 shows the relation of the failure probability and the bend diameter of the multimode optical fiber in which the n value is 30, and a graph G740 shows the relation of the failure probability and the bend diameter of the multimode optical fiber in which the n value is 100.

Note that, with respect to the bending property, while the transmission loss tends to increase upon forming a multimode optical fiber in to a cable when the glass diameter is small, it is possible to inhibit the transmission loss to be a tolerable transmission loss by causing the fiber stiffness to be 9 gf·mm² or more.

Comparative Example

Figure 8:
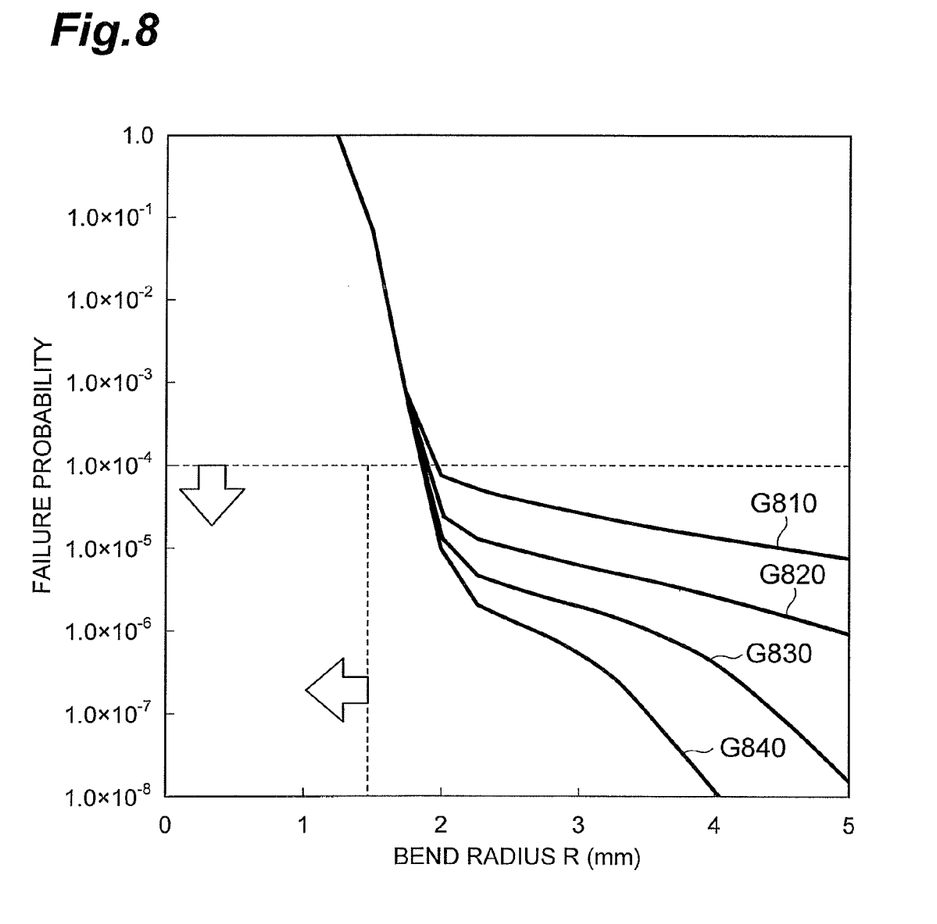
FIG. 8 is a graph showing the relation of the bend radius R (mm) and the failure probability regarding the multimode optical fiber according to the comparative example.

FIG. 8 is a graph showing the relation of the bend radius R (mm) and the failure probability regarding the multimode optical fiber according to the comparative example.

FIG. 8 shows a graph in which the glass outer diameter $2a$ was fixed to 125 μm and the n value was fixed to 20, and the screening level was changed between 1.0 and 2.5%, wherein a graph G810 shows the relation of the failure probability and the bend diameter of a multimode optical fiber in which the screening level is 1.0%, a graph G820 shows the relation of the failure probability and the bend diameter of a multimode optical fiber in which the screening level is 1.5%, a graph G830 shows the relation of the failure probability and the bend diameter of a multimode optical fiber in which the screening level is 2.0%, and a graph G840 shows the relation of the failure probability and the bend diameter of a multimode optical fiber in which the screening level is 2.5%. As evident from FIG. 8, with the multimode optical fiber according to the comparative example (glass outer diameter is 125 μm, n value is 20), it was not possible to inhibit the failure probability upon bending the multimode optical fiber at a bend radius of 1.5 mm or less to be $10^{-4}$ or less.

(Fiber Stiffness)

Figure 9:
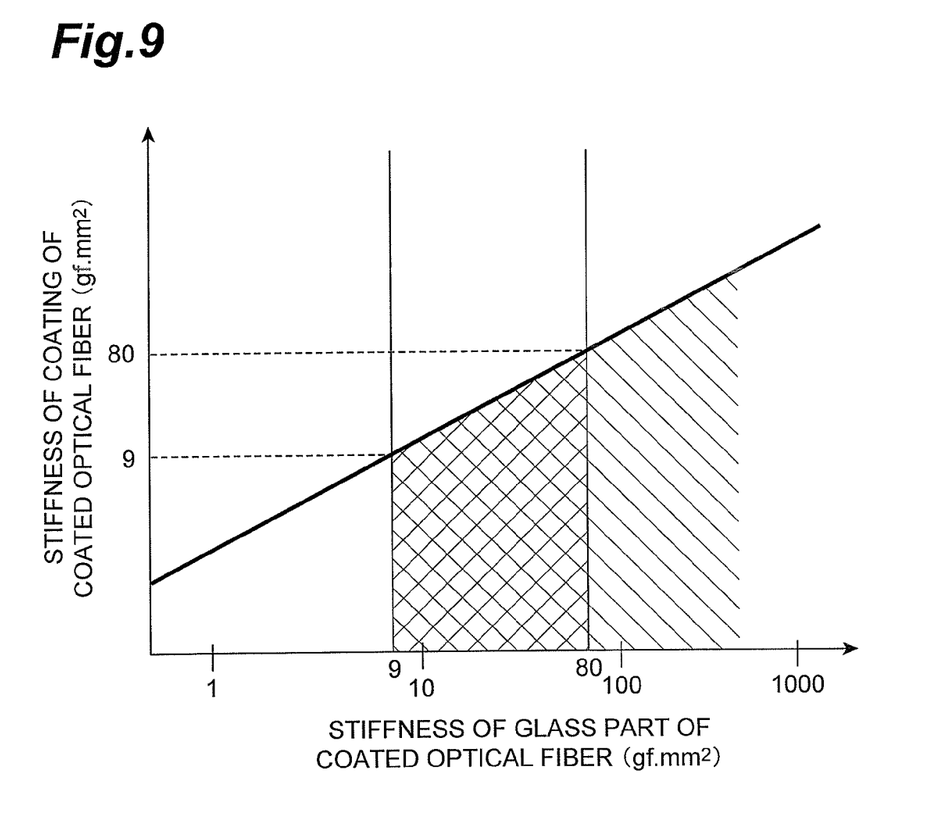
FIG. 9 is a graph showing the applicable range of the stiffness of the glass region and the coating portion regarding the multimode optical fiber according to the present invention.

In the case of the multimode optical fiber 100 according to the present invention, increase of transmission loss that is greater by one digit is tolerated in comparison to a standard multimode optical fiber in relation to the transmission loss relative to an application for use at 100 m, which is one digit shorter than the normal use length of 1 km. Assuming that the transmission loss increase Δα that is tolerated upon forming a standard multimode optical fiber into a cable is 0.05 dB/km or less, with the multimode optical fiber 100, the tolerated transmission loss increase Δα will be 0.5 dB/km (=0.05 dB/100 m) or less. While the transmission loss will increase upon forming a multimode optical fiber into a cable when the stiffness of the optical fiber is reduced, the transmission loss of the optical fiber inserted into a cable can be satisfied by causing the stiffness of the glass portion of the optical fiber having a glass diameter of 125 μm to be 10% or more of 86 gf·mm²; that is, by causing the stiffness of the glass portion of the multimode optical fiber 100 to be 9 gf·mm² or more. In addition, when the stiffness of the glass portion is 80 gf·mm² or less, this is more preferably since the glass diameter will not become too thick and will not become failed when bent. As a result of the stiffness of the glass portion of the multimode optical fiber being higher than the stiffness of the coating member and the covering material on the outside thereof, even if the coating member with a large linear expansion coefficient at a low temperature becomes contracted, the glass will not meander or buckle by succumbing to such contraction and, therefore, it is possible to maintain favorable temperature characteristics without any change in the transmission characteristics. FIG. 9 is a graph showing the applicable range of the stiffness of the glass region (glass fiber 110) regarding the multimode optical fiber 100 according to the present invention.

According to the present invention described above, it is possible to obtain a multimode optical fiber comprising a structure for realizing a wider bandwidth by reducing the group delay difference between the propagation modes. Moreover, it is also possible to obtain a multimode optical fiber capable of satisfying both the inhibition of increase of failure probability and the inhibition of increase of bending loss.

It is evident from the foregoing explanation of the present invention that this invention can be modified in various ways. Such modifications cannot be acknowledged as deviating from the spirit and scope of the present invention, and improvements which are obvious to all persons skilled in the art shall be covered by the scope of claims indicated below.

What is claimed is:
1. A multimode optical fiber, comprising:
   a glass fiber including at least a core region having a GI-type refractive index profile; and
   a coating member provided outside the glass fiber and having a refractive index that is higher than a minimum refractive index of the core region,
   wherein the glass fiber has an outer diameter of 99.9 μm or less, and
   wherein the multimode optical fiber has an n value of 21 or higher, and a screening level of 1.0% or higher.
2. The multimode optical fiber according to claim 1, having fiber stiffness of 9 gf/mm$^2$ or more.
3. A multimode optical fiber, comprising:
   a glass fiber including at least a core region having a GI-type refractive index profile; and
   a coating member provided outside the glass fiber and having a refractive index that is higher than a minimum refractive index of the core region,
   wherein the glass fiber has an outer diameter of 124.9 μm or less, and
   wherein the multimode optical fiber has an n value of 26 or higher, and a screening level of 1.0% or higher.
4. The multimode optical fiber according to claim 3, having fiber stiffness of 9 gf/mm$^2$ or more.

* * * * *